(12) United States Patent
Wolfinger et al.

(10) Patent No.: US 6,415,259 B1
(45) Date of Patent: Jul. 2, 2002

(54) AUTOMATIC WORK PROGRESS TRACKING AND OPTIMIZING ENGINE FOR A TELECOMMUNICATIONS CUSTOMER CARE AND BILLING SYSTEM

(75) Inventors: Chase Wolfinger, Düsseldorf (DE); Rene Sotola, Boulder, CO (US)

(73) Assignee: American Management Systems, Inc., Fairfax, VA (US)

( * ) Notice: Subject to any disclaimer, the term of this patent is extended or adjusted under 35 U.S.C. 154(b) by 0 days.

(21) Appl. No.: 09/354,084

(22) Filed: Jul. 15, 1999

(51) Int. Cl.⁷ .............................................. G06F 17/60

(52) U.S. Cl. ....................... 705/8; 705/7; 705/9; 705/11

(58) Field of Search ............... 705/7, 9, 11, 8

(56) References Cited

U.S. PATENT DOCUMENTS

| | | | | |
|---|---|---|---|---|
| 5,016,170 A | * | 5/1991 | Pollalis et al. ................. | 705/7 |
| 5,093,794 A | * | 3/1992 | Howie et al. ......... | 364/468.06 |
| 5,111,391 A | * | 5/1992 | Fields et al. .................... | 705/9 |
| 5,182,705 A | * | 1/1993 | Barr et al. ..................... | 705/11 |
| 5,212,791 A | * | 5/1993 | Damian et al. ................ | 705/29 |
| 5,325,292 A | * | 6/1994 | Crockett ........................ | 705/9 |
| 5,369,570 A | * | 11/1994 | Parad ............................ | 705/8 |
| 5,408,663 A | * | 4/1995 | Miller ........................ | 709/104 |
| 5,765,139 A | * | 6/1998 | Bondy ............................ | 705/8 |
| 5,765,140 A | * | 6/1998 | Knudson et al. ............... | 705/9 |
| 5,848,403 A | * | 12/1998 | Gabriner et al. .............. | 706/11 |
| 5,911,134 A | * | 6/1999 | Castonguay et al. ........... | 705/9 |
| 5,913,201 A | * | 6/1999 | Kocur ............................ | 705/9 |
| 5,953,229 A | * | 9/1999 | Clark et al. ................. | 700/100 |
| 5,983,195 A | * | 11/1999 | Fierro ........................... | 705/10 |
| 6,032,121 A | * | 2/2000 | Dietrich et al. ................ | 705/8 |
| 6,049,776 A | * | 4/2000 | Donnelly et al. .............. | 705/8 |
| 6,067,525 A | * | 5/2000 | Johnson et al. ............... | 705/10 |
| 6,073,109 A | * | 6/2000 | Flores et al. ................... | 705/8 |
| 6,088,626 A | * | 7/2000 | Lilly et al. .................. | 700/100 |

FOREIGN PATENT DOCUMENTS

| | | | |
|---|---|---|---|
| EP | 0 854 431 A2 | 7/1998 | |
| GB | 98/22897 | * 5/1998 | ........... G06F/17/60 |
| JP | 07200689 A | * 8/1995 | ........... G06F/17/60 |
| JP | 09330861 A | * 12/1997 | ........... G06F/17/60 |
| JP | 411025172 A | * 1/1999 | ........... G06F/17/60 |

OTHER PUBLICATIONS

Blumberg, Donald F; Strategies for improving field service operations productivity and quality, Service Industries Journal v14n2 PP: 262–277 Apr. 1994.*

Houghton et al.; A Planning model for just–in time batch manufacturing, Intl Journal of Operations & Production Management, 1995, vol. 15 Issue 9, p9.*

Dilger, Karen; Everyone wants in, Manufacturing Systems v16n7 pp: 108–142 Jul. 1998.*

Petersen, et al.; A dynamic programming model for assigning customers to priority service classes, INFOR v36n4 PP: 238–246 Nov. 1998.*

Ephron, Erwin; Point of view: Optimizers and media planning, Journal of Advertising Research v38n4 PP: 47–56 Jul./Aug. 1998.*

Inconcert, Inc: "Enterprises Business Integration with Teoss 2000 (TM) and Bea Tuxedo (R)", Internet, Jan. 1999, XP002145575.

(List continued on next page.)

*Primary Examiner*—Vincent Millin
*Assistant Examiner*—Jagdish N. Patel

(57) ABSTRACT

A system of work progress tracking and management in which customer orders may be received and entered into the system. Upon the entry of customer orders the system automatically schedules the orders for completion and optimizes the schedule based on several factors. These factors include work force utilization, customer priority, due date and task dependencies. Further, the system takes into consideration geographical constraints and automatically reschedules and re-optimizes the schedule when changes occur due to unforeseen events.

56 Claims, 9 Drawing Sheets

OTHER PUBLICATIONS

M. Kerr, "A Knowledge Based, Integrated Process Planning and Scheduling System for Document Preparation", Advances in Production Management Systems, 1991, pp. 497–506, XP002145576.

M. Anderson, "Workflow Interoperability—Enabling E–Commerce", Internet, Apr. 1, 1999, pp. 1–11, XP002145577.

* cited by examiner

AUTOMATIC WORK PROGRESS TRACKING AND OPTIMIZING ENGINE FOR A TELECOMMUNICATIONS CUSTOMER CARE AND BILLING SYSTEM

BACKGROUND OF THE INVENTION

1. Field of the Invention

The present invention is directed to a system for work progress tracking and management and, more particularly, to a system for assigning tasks to a workforce, optimizing the scheduling of the tasks, with automatic rescheduling of the tasks while insuring the completion of the tasks before the desired completion date and utilizing the workforce with minimal ideal periods on a geographic basis.

2. Description of the Related Art

In many firms, if not most, personal costs are by far one of the largest, if not the largest, cost a firm has to address. In large telecommunications ("telecom") companies staff costs are also a major cost item and can also have greatest impact on profitability for several reasons. First, schedule optimization of such resources can save significant costs. Second, effective scheduling with customer constraints in mind (access to premises when the customer is available, reliable end-date forecasting) is a major differentiating factor in today's competitive telecom market. Finally, a swift reaction to changing circumstances (preferably transparent to the customer) can increase a firm's competitive advantage in the market by filling orders when other firms cannot.

Telecom companies need to handle orders of customers having significant complexity from diverse domains. These domains include wireline, wireless, residential customers, and business customers. Further, business customer orders are often many times more complex than those found in the residential marketplace. To schedule staff for these customers, telecom companies need to reflect the customer's value. Often a customer's value may be assigned designations such as gold, silver, or bronze. The same order from these three different types of customers may result in three different solutions or methods of filling the order.

Further, these solutions need to reflect the hundreds or thousands of changes, which can happen during a day. Such changes include:

1. Tasks and orders being added, deleted, or modified;
2. The actual duration of tasks can vary from the anticipated duration;
3. The workforce situation also can change due to sickness, or addition of new workforce members; and
4. The ability to load balance between workforce units in different locations and to recognize dependencies between tasks, both at the workforce level and external system level also adds to the complexity.

The foregoing dependencies are complex, particularly when volume is high. All optimization changes that can occur in a high volume environment need to be effectively handled. Furthermore, the same workforce handles new orders (installations) and maintenance. Maintenance loads can change so significantly that the system must include a percentage of the workforce that are reserved just for maintenance tasks. This percentage of the workforce dedicated to maintenance must be "invisible" to the scheduling process and be able to fluctuate from one day to another.

Scheduling optimization also must be based on more than one parameter. One such parameter is order priority, which may reflect the value of the customer as discussed above. Another is flexibility, which is needed to reflect the desired workforce utilization. For example, one telecom company may desire to schedule their workforce to 75% of maximum capacity, while another prefers to operate at 90% utilization, leaving the remainder capacity for trouble tickets or handling emergency calls. A telecom company needs to be able to change this percentage quickly based on the rescheduling of orders already in the system. By doing so, it can smooth the "peaks and valleys" in the load in both the new orders and maintenance areas.

Given the number of possible permutations based on daily changes, each with a potential impact to the schedule, solutions with manual intervention are sub-optimal and cannot meet the needs of large telecom companies. Furthermore, the system must both automatically integrate workflow with scheduling, then re-optimize the orders based on the latest situation during the day while taking into account work order priority, risk (how close are we to slipping the date committed to the customer) and keeping costs to a minimum.

No integrated solution for the above identified problems is known to exist which can manage workflow, scheduling, and optimization of workflow and the workforce based on multiple parameters.

There are workflow products on the market but most do not provide any planning interface. Those which do, do not provide an interface to workforce or an automatic method to regularly re-schedule based on the latest data.

Examples of workflow products include InConcert™ and FileNet™. InConcert™ provides interface to MSProject™, which is single-dimension planning. There is no rules engine within either of the two products.

There are workforce management systems on the market. Some do not understand the concept of an order (i.e. all activities in the work pool are considered to be one order). In this situation the system does not understand order priority (high, medium, low). Further, such systems do not distinguish between orders, which consist of tasks, and the tasks themselves. Furthermore, no system is known that provides for automatic rescheduling based on composite parameters.

What is needed is a work progress tracking system is needed that is sophisticated enough to handle the above described level of complexity, which also can include integration among workflow, scheduling, and workforce management, while also applying automatic re-optimization on a regular basis. This system should also operate without significant manual intervention and schedule tasks based on several constraints.

SUMMARY OF THE INVENTION

It is an object of the present invention to provide a method of integrating workflow, workforce management and scheduling functional paradigms.

It is a further object of the present invention to combine state of the art tools (an inference engine and a sophisticated scheduler) to provide online and offline optimization based on configurable criteria.

It is a further object of the present invention to automatically re-optimize all orders based on the data gathered during the day (deltas of actuals and planned, new orders, and canceled orders).

It is another object of the present invention to optimizes schedules based on multiple criteria including: minimization of costs; minimization of gaps in work pool assignments; order priority (high, medium, low); and jeopardy to the schedule.

It is still a further object of the present invention to combine the foregoing objectives with a sophisticated scheduler that considers the start and finish dates and considers the target percentage workforce utilization when scheduling.

It is a further object of the present invention to automatically reschedule all jobs offline when a change in utilization parameter occurs. Thus, when the utilization parameter drops from 80% to 70% the distributed offline system 102 reschedules all current jobs to reflect the change in the workforce.

It is an additional object of the present invention to be able to flexibly schedule taking into consideration the geographical area. With such a geographic capability it is possible to include members of a different work pool to help with activities outside their home base area when needed. Once such work pool members are designated as available outside the home base, the system automatically takes their availability into account during the offline scheduling run and reschedules all jobs accordingly.

It is also an object of the present invention to allow for flexibility of the system in the area of "stability zones" representing time periods in which assigned tasks may not be rescheduled. These stability zones are based on parameters the user specifies and the length of time allotted to each zone.

It is another object of the present invention to provide for optional explicit "locking" of tasks during an offline run. When tasks are "locked" they will not be modified during the offline run. An Example of locking can be seen in fulfilling an order where there is a "dependency" on customer, such as, a visit to customer premises. When rescheduled, it would be desirable to insulate the customer from changes, i.e. "lock" the task where such dependency exists, and schedule around it. Another example of locking is scheduling against a given date, e.g. customer says he'll place an order if it can be fulfilled by a particular date. It would be desirable to "lock" the completion date and ensure rescheduling does not impact it.

It is still a further object of the present invention to provide for flexible workforce scheduling based on multiple parameters. These can reflect such items as "customer value", utilization percentage (the same workforce typically works on installation and trouble tickets, so if there is a high number of trouble tickets, it's possible to decrease utilization on installation), "finish before" or "finish after" an event or date, duration of zones (frozen zone, stability zone, optimization zone), and duration of time slots.

It is a further object of the present invention to perform on-line scheduling of new and modified activities during the day as they occur.

It is also a further object of the present invention to maintain stability of the schedule with respect to re-scheduling. This stability of the schedule relates to the frozen zone, stability zone, optimization zone. The zones and their functions are described in detail later, together with pictorial representation. The other aspect of stability of the schedule is the flexibility to "lock" tasks (either dependencies or delivery dates) so as to make internal schedule changes transparent to the customer.

It is still a further object of the present invention to produce highly optimized schedules. These schedules take into consideration order priority, make duration of composed activities small, and avoid gaps in work pool utilization. activities typically comprise several tasks. The system schedules as many of the tasks in parallel as possible, thus producing the shortest possible critical path for the overall composed activity. Further, these schedules plan for as many activities as possible.

It is also an object of the present invention to take into consideration that activities have to be assigned to individual work pool members.

It is still a further object of the present invention that the system not violate certain constraints and should not yield empty schedules, i.e. the user get back a valid schedule but certain constraints can be softened.

It is an object of the present invention to compute a target completion date for orders that do not have a target completion date specified to prevent the situation where the low priority orders are never fulfilled.

The above objects can be attained by a system that manages workflow, the workforce, scheduling, and optimization of workflow and the workforce based on multiple parameters. These parameters include such items as customer value, workforce utilization, and geographic regions. Whenever a change occurs, re-scheduling and optimization is done automatically.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
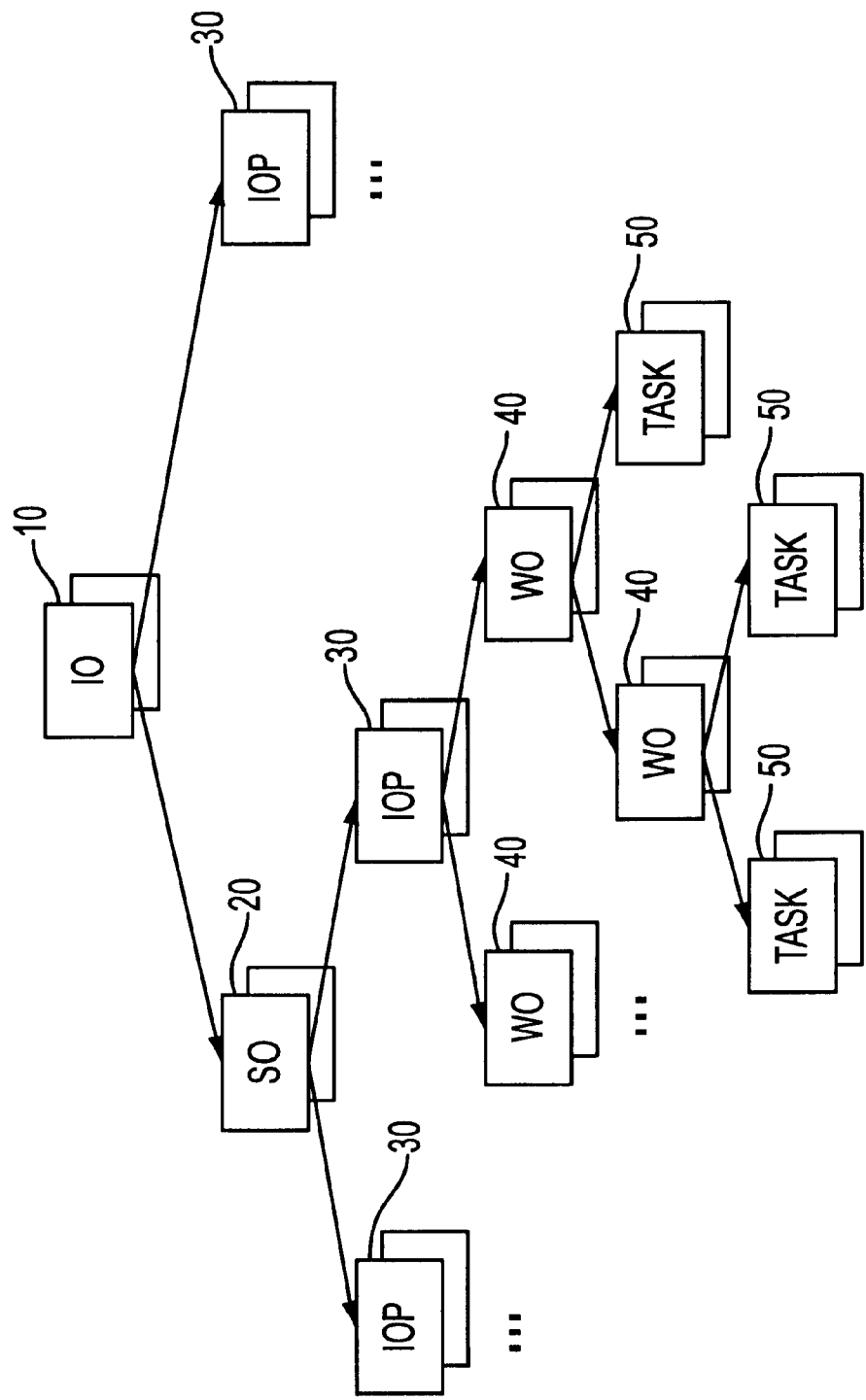
FIG. 1 is a diagram of an activity tree generated by a customer order.

Before discussing the features of the present invention a summary of the terms used in the discussion herein will be provided.

A customer order is a collection of activities, which can cross several regional locations. Activities can be linked by dependencies. Dependencies can also exist between orders.

Activities comprise tasks, which are either automatic or manual. Manual tasks have to be performed by individual workers (workforce resources), while automatic tasks are performed by the Order Processing system. Each manual task can be performed by one or more workers from the resource pool.

A customer order from a client is mapped to an internal order inside the system. Internal orders are divided into several types of sub-activities. Dependencies can exist between different activity levels.

Utilization is the percentage of a workforce allocated to scheduled activities. The delta (or difference) between 100% and this percentage is typically the workforce being allocated to maintenance and other unpredictable tasks also known as "trouble tickets". It should be noted that as shortages of resources can be addressed through overtime, utilization above 100% is allowed.

At a basic level, individual workers can perform different activities. Each worker is assigned to one or more resource pools. A resource pool is used to aggregate workforce capacity by tracking capacity within across various time periods. These time periods are known as time slots. A resource pool is determined by a regional location and a specific role. The workforce resources provide capacity to the resource pools. One worker can provide capacity to many pools because that worker can fulfill different roles. However, the worker cannot contribute capacity to more than one resource pool at the same time. For example, for each time slot a workforce resource can only provide a maximal capacity of 1 (to 1 resource pool), e.g. from 8 am to 12.30 pm to pool 1 and from 1 pm to 5 pm to pool 2. When a worker is assigned to a task the worker is not available for other activities. That worker is used to 100% of capacity.

A resource pool is a group of workers qualified to perform a role. A resource pool is characterized by a regional location and the role. For example, all ditch diggers in Denver or all truck drivers in Boulder may be considered a resource pool since they are in the same geographic area and possess the same skills. The scheduling system assigns tasks to resource pools. Assignment of worker names to resources is done shortly before the task is due to start such as a day earlier. Tasks are assigned based on roles first, e.g. Technician I (where I refers to the skill level). The system knows how many Technician I's there are. Thus, if people rotate (e.g. John Smith, who is Technician I leaves, and Jane Doe who is also Technician I joins, this is transparent to the scheduling subsystem.

Workforce resources are not limited to working on tasks but have other duties such as trouble ticket handling. As a consequence, the resource pool capacity can only be exploited up to a certain percentage as provided by the utilization value.

Orders, suborders, internal order positions and tasks have unique regional locations assigned respectively thereto. For example, only pools from a certain regional location are used for certain orders. It should be noted that the flexibility exists to change the work pool allocation of resources. For example, if the Denver work pool has spare capacity and the Boulder work pool is over booked, it is possible to make certain members of the Denver work pool available for orders to be done in Boulder for a defined period of time due to the physical proximity of Denver and Boulder. This change in availability is done manually. Once it is completed, the offline optimization run will automatically include the new members on loan for the purpose of planning the Boulder tasks, and automatically to exclude the same members for jobs planned in Denver.

A calendar defines the times when a workforce resource fills capacity in a time slot. There are periodic times of unavailability like weekends, shifts, and single times of unavailability like holidays, public holidays, sick leave, etc.

A calendar rule defines the dates and time a workforce resource for a resource pool is either available or unavailable for assignment. This information includes the workforce member's sick days, shift schedule, and vacation.

Scheduling is the process of organizing a set of activities into an "optimal" order, based on the parameters supplied. The scheduling of each task takes into account dependencies, priority, duration, staff availability per job category (work pool), and material resources. During the day, on-line scheduling is performed on an order-by-order basis. During the night, offline optimization runs are started for all orders in the system.

An internal order ("IO") consists of sub-orders and internal order positions. Internal orders can cross more than one regional location. A dependency to other internal orders can also exist. Internal orders can represent a customer order received either from an external system or an internally generated order by the telecommunications provider.

A sub-order ("SO") consists of internal order positions.

An internal order position ("IOP") consists of work orders and tasks and can be dependent on other IOPs.

A work order ("WO") consists of work orders and tasks. Dependencies to other work orders can also exist.

A time slot is a period of time in which activities can be processed. It is defined by a start time and an end time such as from $27^{th}$ July, 8 am through $27^{th}$ July, 12.30 pm. A time slot is assigned to a resource pool. The time slots of a resource pool do not overlap. Time slots are filled with capacity from workforce resources. The minimum length of a time slot can be set to as little five minutes. In general, one task has a unique time slot. If a task is longer than the time slot, the task is assigned to several time slots. For example, a task has a process time of 3 hours, but time slots have duration of 2 hours. In this case the task starts at the beginning of the first time slot (and not anywhere in the middle) and finishes in the middle of the second time slot. It should be noted that no mutually dependent tasks are assigned to the same time slot. This is done to prevent a situation where a task slips and the following (dependent) task cannot start.

As discussed above, workers are collected into resource pools, which are composed of different time slots. Workforce calendars describe when the individual work pool member is working and the system automatically calculates the capacity for the time slots within the resource pools. Only manual tasks require resources during processing. Automatic tasks are performed by the computer system without human intervention. Activities are the basic components in the present inventions.

Constraints are directly related to scheduling of tasks. Examples of constraints include: time constraints indicating starting and finishing times; precedence constraints indicating that a task is to start after the end of another task; and source constraints indicating that a task requires a resource such as a worker.

A template is a set of tasks corresponding to a telecommunications product. The template specifies in which order tasks need to be done and the task duration. It is the "best case" situation, i.e. such a schedule would be met only if all resources were available as per such template. The template is then taken as input to the planning and optimization process, where the tasks are checked against resources available in the work pool, or external resources (e.g. materials availability). The "real" schedule is then derived based on the order priority, work pool resources and the schedule tightness.

The workflow templates support conditional branching, as well as branches within branches. This is done through the creation of branches within the workflow and adding execution conditions to these branches. Conditional workflows can be based on time, service characteristics, etc. Thus, tasks can be added or removed automatically depending on the specified conditions.

Using the foregoing defined terms, a detailed description of the preferred embodiment of the present invention will be provided, examples of which are illustrated in the accompanying drawings, wherein like reference numerals refer to like elements throughout.

Figure 3:
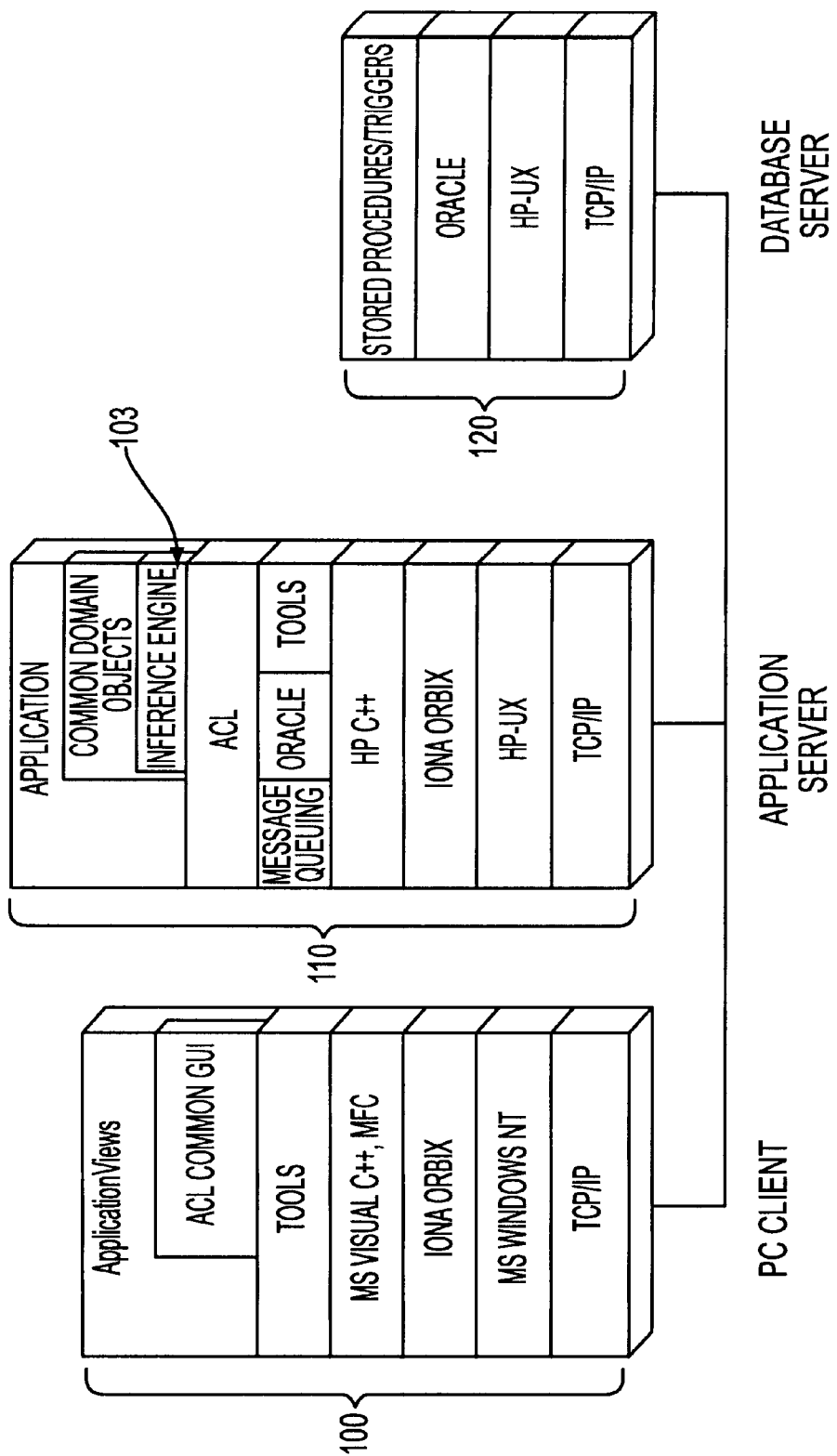
FIG. 3 is a diagram showing the physical architecture of the present invention with a client personal computer ("PC"), an application server (where scheduling, workflow, calendar functions take place), and a database server.

FIG. 1 is an example of an activity tree. A customer order entered through a PC client system 100 shown in FIG. 3 is mapped to an internal order 10 ("IO"). Internal orders 10 are divided into several types of sub-orders 20 ("SO") and internal order positions 30 ("IOP"). The sub-orders 20 may then be further divided into additional IOP's 30 and the IOP's 30 may in turn be divided into additional work orders 40 ("WO"). Finally, WO's 40 may be divided into one or more tasks 50.

Figure 2:
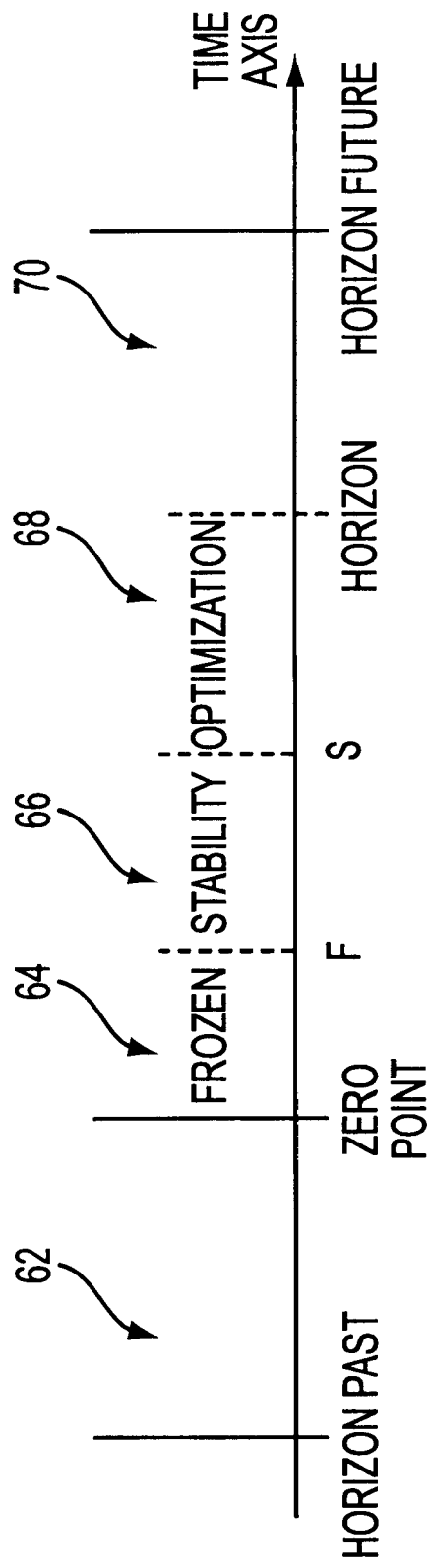
FIG. 2 is a diagram showing the five different time zones related to optimization and scheduling of the present invention.

FIG. 2 illustrates a time line having five different time zones related to optimization processing. The times zones start with a horizon past to zero point time zone 62. Tasks, which start between horizon past and zero point are not planned or modified since they either represent work in progress or work completed. Tasks in this time zone are considered only for their temporal constraints.

For example, the time period of the horizon past time zone may be up to one year. The beginning of this zone must be earlier or equal to the start value of all activities. This zone is necessary to take into account dependencies to activities, which are already finished or still in progress.

Figure 4:
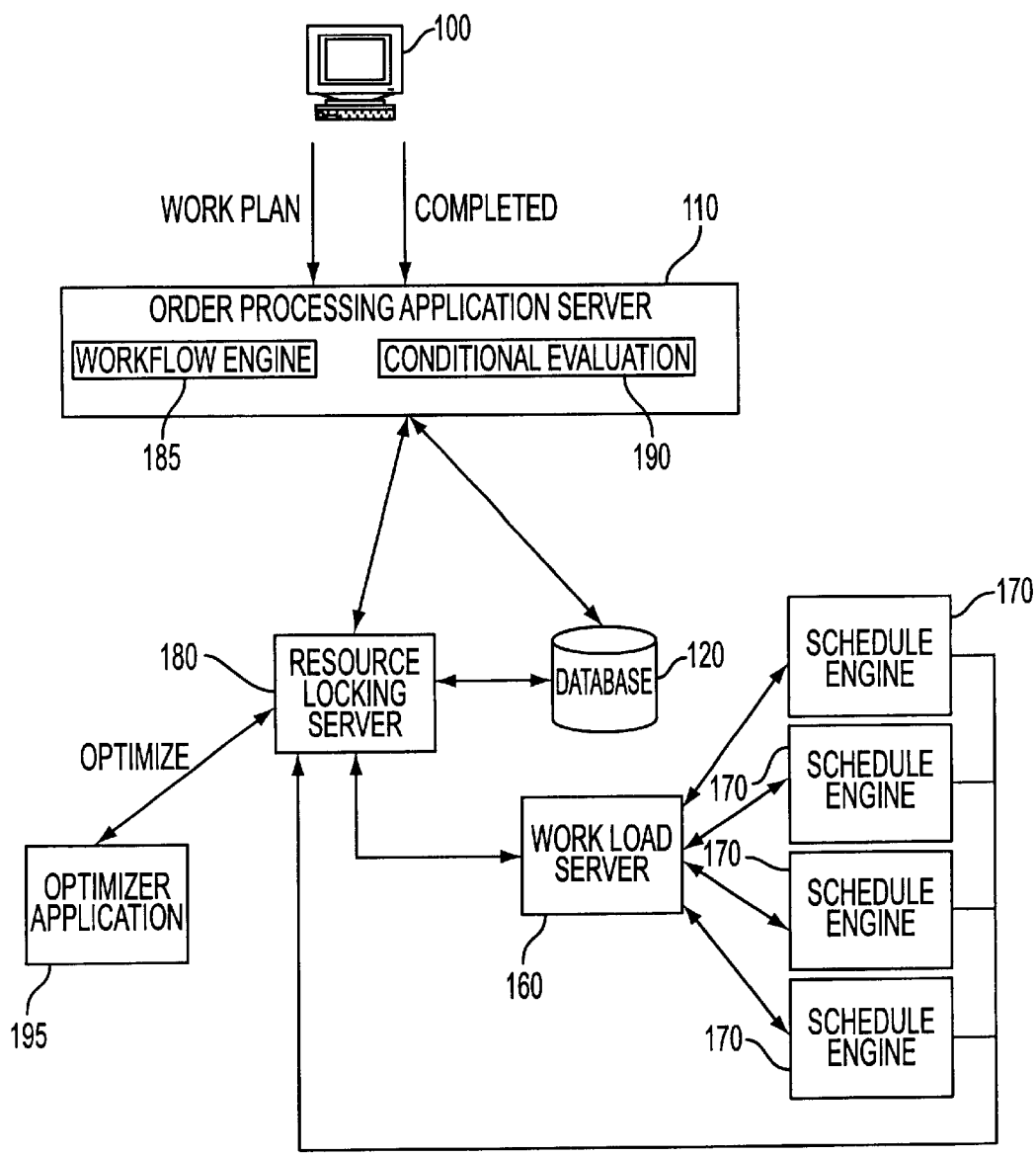
FIG. 4 is a diagram showing the overall software architecture for the present invention for both the distributed online system and distributed offline system.

Still referring to FIG. 2, the frozen time zone 64 represents a time period in the future. An individual resource assignment made for tasks that start in this zone 64 cannot be changed. Thus, the schedule engine 170 shown in FIG. 4 is not allowed to touch tasks in this zone 64. Again, the system only takes into account the corresponding temporal constraints for tasks that start in this time zone 64. Therefore, changes to task in this time zone 64 can only be only be done manually by a user.

For example, the typical length of frozen zone 64 may be set to one day. A value of zero is not allowed for a frozen time zone 64. If the day has started, then the rest of the day is treated as frozen zone, thus the smallest value for a frozen time zone is one day.

The purpose for the frozen time zone 64 is to prevent the system from making last minute changes to schedules to which it would be difficult for human workers to respond. It should be noted that the frozen zone duration (as indeed any other zone duration) is configurable by the user.

Still referring to FIG. 2, in a stability zone 66 the schedule engine 170 shown in FIG. 4 can assign tasks to time slots which have gaps which are idle times when no activity is scheduled. The goal of the optimization algorithm (in both online system 101 and offline system 102 shown in FIG. 4) is to minimize idle time, and ideally to bring it to zero. However, there will be gaps in situations where there are not enough installation orders, or an order has been canceled at the last minute, etc. It can also happen that a worker has a gap of one hour, but all outstanding tasks are two hours. If there is a gap of two hours and the online system 101 needs to schedule a two hour task, it would fill this gap. Gaps are defined as "installation gaps", obviously a company would have workers do other non-installation work rather than keeping them idle. The scheduling engine is allowed to fill in gaps in stability zone 66, but not to take out or move tasks already scheduled. This is done to minimize changes in stability zone 66 and insure no sudden and unexpected last minute changes. The typical length of time for stability zone 66 is one week. However, this is set by an authorized user and can vary according to the authorized user's preference.

Still referring to FIG. 2, in the optimization zone 68 the schedule engine 170 shown in FIG. 4 is allowed to re-assign activities. Hence, this zone 68 is not stable with respect to rescheduling. Work orders may be rescheduled in order to produce the optimum schedule possible. The typical length of time for the optimization zone 68 is two months. However, the length of time for this period may be altered by an authorized user.

Still referring to FIG. 2, the horizon to horizon future time zone 70 contains tasks that do not have a planned end date before the horizon point and are not assigned to time slots. The typical length of time in this zone is one year.

The length of each zone is configurable and can be changed at any time.

Referring to FIG. 3, this figure illustrates the overall physical architecture of the present invention in the form of a three tier computer system. FIG. 3 depicts a PC (personal computer) client system 100 connected to an application server 110, and a database server 120. The PC client system 100 acts as primary interface to order entry staff and permits the entry of new orders, modification of orders and deletion of orders. The application server 110 is where scheduling, workflow, and calendar functions take place. The database server 120 is where the data is stored.

The architecture shown in FIG. 3 is called a 3-tier architecture. The main advantage is that if the application server 110 is overloaded, the customer can simply add additional application servers 110 to the network without rewriting any application software. In the typical telecom environment millions of transactions per day are likely to occur. If the invention was used in a very small environment, we could just have the PC Client system 120 and one server, in which situation the "business logic" shown on the application server 110 would run on the PC client system 120. Such a configuration is called 2-tier architecture. The problem with a 2-tier architecture is that if the client server 110 is overloaded, there is nothing that can be done to spread the load (other than to perhaps add more memory to the PC, or buy faster PCs, none of which may solve the problem). A 2-tier system would be extremely limited and would not be able to handle the possible load anticipated.

Referring to FIG. 3, the PC client system 100 uses TCP/IP as the communication protocol between the PC client system 100 and the application server 110. The PC client system 100 uses a Windows NT Operating System. Application programs using Microsoft Visual C++ and Microsoft Foundation Classes are run on the PC client system 100. MS Project is used to graphically represent the relationship among different tasks. However, it should be noted that all optimization is done by the scheduling engine 170, not by MS Project. Orbix from IONA is the Object Request Broker of choice used for communications between the PC Client system 100, the application server 110. TCP/IP protocol is used for communications. Applications views represent the Graphical User Interface a Customer Service Representative (or any other user) uses to interact with the system. All application logic, i.e. scheduling, workforce management, workflow, reside on the application server 110. Communications can be between the PC client system 100 and the Application Server 110, between the Application Server 110 and the Database Server 120. All communications to the Database Server 120 goes through the Applications Server 110.

Still referring to FIG. 3, both synchronous and asynchronous communications are supported. The communications protocols, methods etc. are provided by ACL ("AMS Class Libraries", not shown). ACL represents a set of common functions used by all applications. Examples of functions provided are database access (read, write), communications access, and messaging.

Still referring to FIG. 3, all data resides on the database server 120. As the invention described is an object oriented (OO) system, the translation between objects and the relational database on the database server 120 is done through a persistence layer (not shown). This layer is responsible for "mapping" objects to database tables. The persistence layer is part of ACL (not shown). Note that a typical system is installed on either a Local Area Network (LAN) or Wide Area Network (WAN), supporting hundreds of clients and tens of application servers and database servers.

Still referring to FIG. 3, all application logic (workflow, optimization) resides on the application server 110. The application server 110 uses sophisticated $3^{rd}$ party technology—ILOG™ Rules, ILOG™ Solver and ILOG™ Scheduler (not shown) which form the basis of the schedule engine 170 shown in FIG. 4. ILOG™ Rules is an inference engine, which facilitates the construction of intelligent agents for decision making in real time. ILOG™ Rules agents monitor and evaluate highly complex conditions and provide extremely fast decisions (around 10,000 rules per second are executed on a Pentium 200 MHz processor). ILOG™ Rules agents can carry out fast multiple criteria searches, detect specific conditions and prioritize actions. ILOG™ Rules monitors workflow status ("completed", "pending", "in progress") and perform conditional workflow evaluations. Rules processing is effective when the application logic is best described as a set of interacting rules that govern actions in response to known conditions. Rules are used to govern task and information routing. ILOG™ Rules supports both C++ and Java. The implementation described in this invention is in C++.

ILOG™ Solver is a constraint-programming library for finding the best solutions out of a high number of possibilities. ILOG™ Solver supports non-linear modeling and its solution algorithms (constraint propagation, branch-and-bound, and numerical and logical processing) can be used to solve very complex problems. The basic algorithms use two ideas: a) Explicitly represent the set of values that a decision variable can take, b) Represent the search for a solution as a tree traversal. When ILOG™ solver follows a branch of a node, it assigns the value of the branch to that variable. Solving the problem can thus be visualized as finding a solution from the "root" node down to the "leaves".

ILOG™ Scheduler utilizes the ILOG™ Solver engine by integrating algorithms specific to scheduling (e.g. links between activities and resources).

The application server 110, shown in FIG. 3, includes an inference engine 103 (also known as the Rules engine), which is the basic building block for the workflow part of the system. The ILOG™ Rules available from ILOG™ product is preferably used as the inference engine 103. The application server 110 also includes a schedule engine 170 shown in FIG. 4, capable of optimizing on several parameters through the recognition of Boolean operands (e.g. 'AND', 'OR' etc.). The ILOG™ Solver and Scheduler available is preferably used as the schedule engine 170 shown in FIG. 4.

The following table serves to define all items that appear in FIG. 3.

| Layer | Description |
| --- | --- |
| ACL | AMS Class Library which provides infrastructure support for server-based processing. |
| ACL Common GUI | ACL classes that provide infrastructure support on a PC client. |
| Application | The CCB server-based application software. This layer includes the implementation of the business objects defined in the CCB object model designs. |
| Application View | That part of the CCB on-line application software that provides a user interface. |
| Common Domain Objects | These objects provide common classes that can be leveraged in different parts of the application to provide support for common services and functions. |
| HP C++ | C++ programming language. |
| HP-UX | UNIX for HP servers. |
| Iona Orbix | CORBA 2.0 Object Request Broker (ORB) |
| Message Queuing | This provides guaranteed delivery for messages sent between processes. CCB uses a custom approach for CCB 2.0. In a later CCB version, Arcor may wish to replace this by a third-party product like IBM's MQ Series. |
| MS Visual C++, MFC | Microsoft C++ compiler and Microsoft Foundation Class libraries. |
| Oracle | Oracle client and server software. |
| Stored Procedures | Application-specific Oracle stored procedures |
| TCP/IP | Network Communication protocol. |
| Tools | On servers, this includes third-party products like Rogue Wave Tools. h++ and ILOG class libraries that are integrated into CCB software, as well as "black box" components like Architel ASAP and ISIS Papyrus that provide standalone application services. On a PC client, this covers products from Sting Ray (e.g., Objective Toolkit grid controls). |

In a typical environment there are a large number of PC client systems 100. Also, the system works in a distributed fashion so that both the application server 110, and the database server 120 as well as the PC client system 100 can be in several geographically distributed locations.

The Distributed Online System

Referring to FIG. 4, this figure is an overall diagram of both the distributed online system 101 and distributed offline system 102 of the present invention. Further, the online system 101 is detailed in FIG. 5 and the offline system is detailed in FIG. 9.

The main difference between the online system 101 (shown in FIG. 5) and offline system 102 (shown in FIG. 9) is the online system 101 is triggered by a user. This user may be a Customer Service representative, who uses the PC client system 100 and enters new orders, or order cancellations using another subsystem. Another user could be a workforce supervisor, who enters actual completion date/time also through the PC client system 100.

In the offline mode the offline system 102 runs in batch mode. The offline system 102 may be triggered to run at a pre-determined time at which time the offline system 102 starts re-optimization.

The sophistication of optimization in the offline system 102 (shown FIG. 9) allows for potentially all tasks for the whole workforce in the "optimization zone" to be re-scheduled as a result of one offline run. An example of such a total re-optimization may be occur when the workforce utilization parameter is changed.

In the online mode the online system 101 takes the currently scheduled tasks as "fixed" and looks for spare capacity to schedule new tasks. For example, the online system 101 does not try to reschedule the whole workforce as a result of the taking or canceling of an order.

Figure 5:
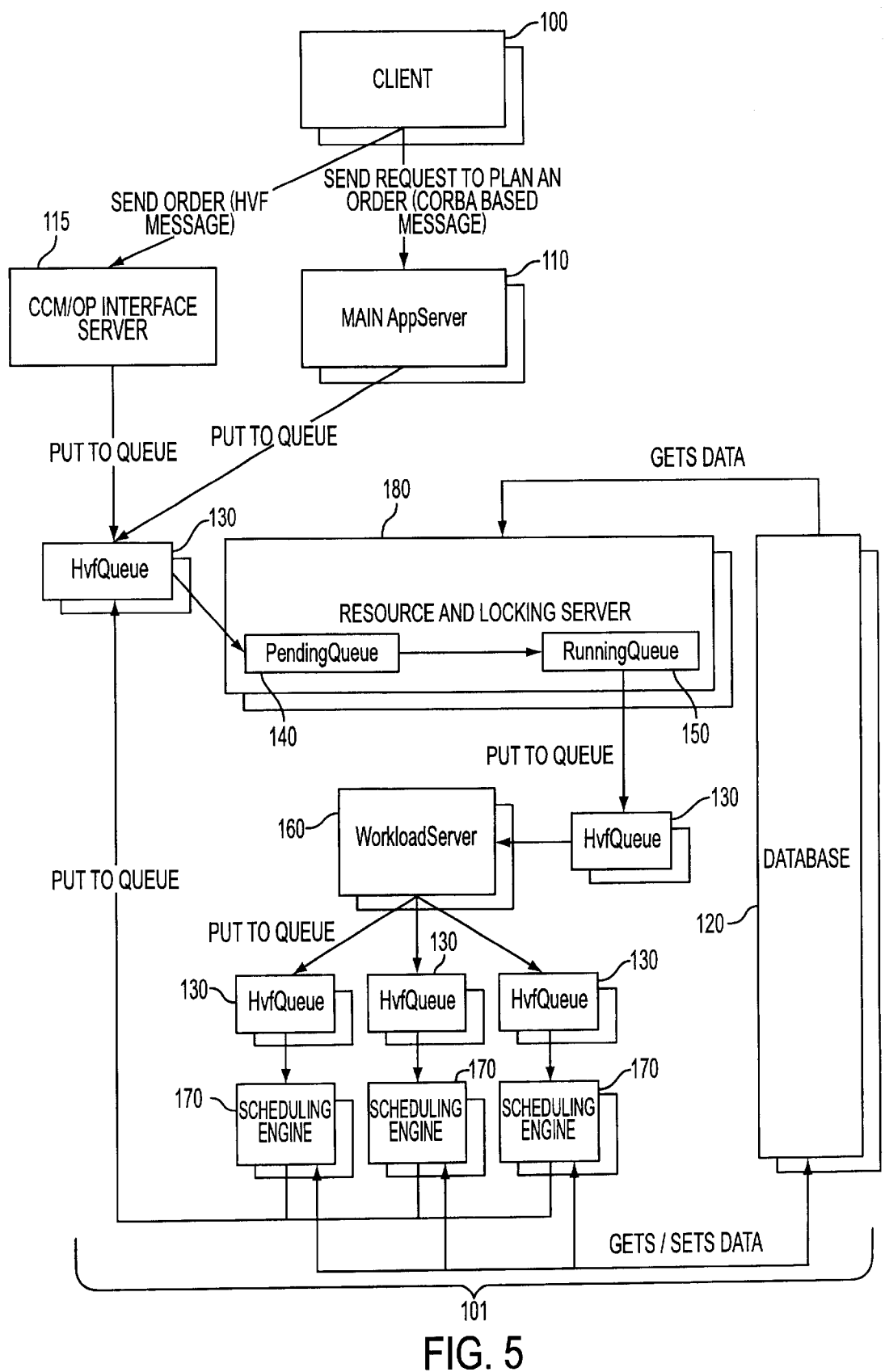
FIG. 5 is a data flow diagram of the online system showing the progression of activities during the day. Such activities include: new activities being entered; older activities being modified or deleted; and actuals from jobs in progress being entered.

The distributed online system 101 shown in FIG. 5 optimizes the tasks for the current day and individual new orders taken during the day using optimizer application 195. As discussed in detail below, the new orders entered on PC client system 100 are optimized using the offline optimization results from the previous running of the distributed offline system 102 run. The distributed online system 101 enforces workflow, i.e. a sequence of tasks during the day. The online system 101 does this enforcement of workflow, i.e. the sequence of tasks, by showing a list of tasks for the day and time slot against each worker. The online system 101 then monitors deltas of the planned actual completion time per task.

For Example, the online system 101 could have tasks scheduled for the afternoon which are dependent on the completion of morning tasks. If the actuals from the morning slip, the distributed online system 101 detects this event and ensures the workforce members are not sent to execute tasks in the afternoon for which dependencies have not been fulfilled. It is based on a sophisticated inference engine 103, shown in FIG. 3. Using generated workflow, tasks can be added or modified and removed either automatically or manually. As defined above, each order consists of tasks. Automatic removal of tasks would take place, for example, when an order has been canceled. When the customer service representative cancels an order, the system will remove all tasks relevant to the order. Further, an authorized person could go in and manually modify a task by either extending a task duration, and adding or deleting a task.

The sequence of steps required to create a workflow occur in the following sequence.

First, a workflow template designer creates workflow templates. Such templates define the set of tasks necessary to fulfill an order. The template contains the duration of each task, the order in which tasks need to be executed as well as task dependencies. The result is the "best case" workflow, which would be achieved if all resources were available when needed. The template definition is done in advance of taking any order, and the workflow templates are stored in the database 120.

Second, the Application Server 110 receives an order from the PC Client system 100. It matches the order to the appropriate workflow template(s) discussed above. FIG. 5 (the Online system) illustrates sending a request to plan an order within Order Processing (from PC Client system 100 to the main application server 110). There is also a CCM/OP Interface Server 115 (Customer Care/Order processing interface server), shown in FIG. 5, through which an order is sent from Customer Care to Order Processing.

Third, the scheduling engine 170 takes the template as input to online optimization, checks on the availability of resources in the resource pool and comes up with the "realistic workflow" linked to available resources, rather than the "best case" workflow, which was the starting point.

An example of an automatic addition is a new order. The order construction process invokes the workflow engine 185 shown in FIG. 4 and then invokes the schedule engine 170 (ILOG™ Solver/Scheduler) shown in FIG. 4. The scheduling engine 170 schedules a new order.

An example of a manual modification is the completion of tasks, where the actual completion time and date are entered into the system by an authorized work pool member, i.e. a manager, using PC client system 100. The workflow engine 185 shown in FIG. 4 automatically checks and cleans up inconsistencies and contradictions after manual input. For example: an inconsistency exists when an authorized user entered a new task X with a start date of June 1 to an existing order. However, the task dependency for task X is not fulfilled until June 5. The workflow engine 185 detects a new request and puts the newly modified order through the scheduling engine in the offline run, which results in task X starting on June 5.

A clean up occurs when the workflow engine 185 detects a new/modified task and runs it through the schedule engine 170. The schedule engine 170 corrects the inconsistencies and contradictions. This checking and clean up function of the workflow engine 185 has two positive side effects. First, such inconsistencies are checked and corrected immediately, preventing a negative impact of such errors on the daily progress. Second, as discussed later, the immediate automatic action ensures that "clean" workflow is input to the offline system, which is typically run in the off-peak time.

The workflow engine 185 is triggered by a user action, e.g. a modification of a task or entering a new order, entered at PC client system 100.

Referring to FIG. 4, the Order Processing Application Server 110 also supports conditional evaluation 190. Conditional evaluation 190 performs a conditional workflow which is a workflow that contains branches which group activities. A branch (and its activities) may be active, indicating that its activities will be performed, or inactive. Branches may nest; however, they may not overlap. Thus, an activity will have at most one branch as its immediate parent, although the activity may "belong" to more than one branch, via the branch hierarchy. Descendants of a deactivated branch are deactivated.

A branch's activation is controlled by a set of user-defined predicates, or execution conditions. A condition may reference attributes of activities within the workflow as well as values of service characteristics associated with the containing service order (if the workflow is attached to a service order). Conditional evaluation 190 combines a condition with the state of workflow activities and values of service characteristics to determine whether the branch condition is true. A branch's execution conditions are "true" if at least one of the branch's execution condition's expressions evaluate to "true". If a branch is evaluated to true then the tasks and work orders contained within the branch are automatically added to the workflow.

Scheduling Input

Each day new customer orders are entered into the system using the PC client system 100. The orders comprise dependent tasks 50 shown in FIG. 1. They are entered from different regional locations via PC client system 100 via the Customer Care System. The order is sent to the CCM/OP Interface Server 115 (Customer Care/Order processing interface server), shown in FIG. 5. The main application Server 110 shown in FIG. 4 recognizes orders based on predefined templates. Such templates, discussed above, correspond to telecommunications products, which in turn translate to valid internal orders 10 taken from the customer.

When a new order comes in, it is scheduled immediately based on known constraints (e.g. workforce availability). If the order consists of automatic tasks only, it is executed immediately. If there are manual tasks in the order, the earliest start of the order execution is the following day. This is to enable the distributed offline system 102 to re-optimize based on the latest situation captured through actuals during the day.

Figure 6:
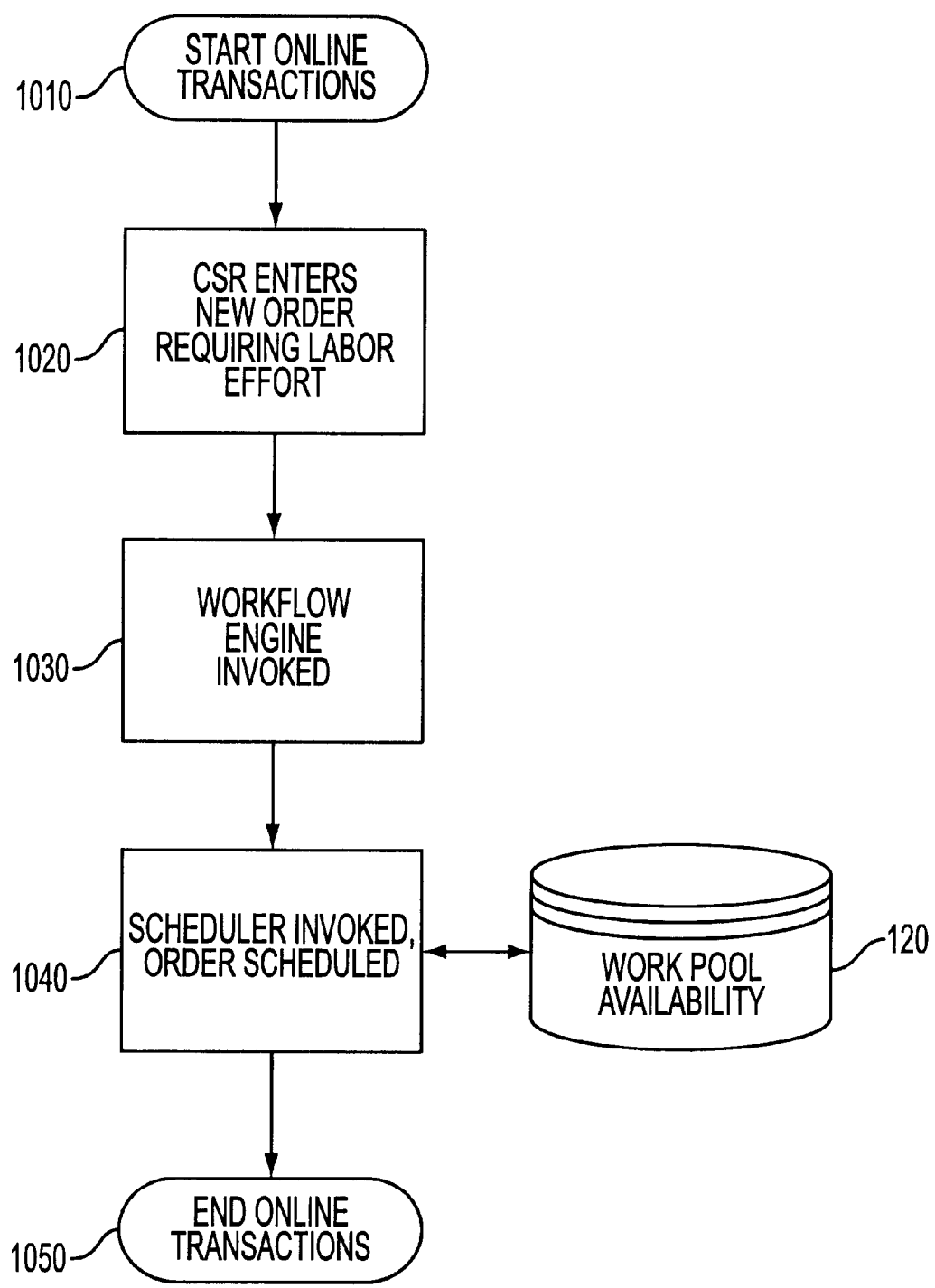
FIG. 6 is a flowchart showing a portion of the online system shown in FIG. 5 dealing with entering new orders.

The online scheduling accomplished by the distributed online scheduling system 101 is illustrated in FIGS. 5 and 6.

Referring to FIG. 5, a customer service representative enters a new order using the PC Client system 100. The application server 110 retrieves the appropriate workflow template. The application server 110 determines whether the order can be activated automatically, i.e. without any workforce intervention, in which case the workflow engine guides the order through the other computer systems (not shown) to the completion. When human scheduling is required the following steps occur.

First, the order is put into a scheduling queue 130 to be picked up by the Resource and Locking Sever 180, which starts scheduling engines 170 and maintains a pending queue 140 and a running queue 150. Jobs whose resource pools are being used to schedule another order are kept in the pending queue 140. Jobs, which have free resource pools move to the running queue 150 to be scheduled by the scheduling engine 170. The scheduling engine accesses data—e.g. workforce availability—in the database 120.

Referring to FIG. 6, in operation 1010, the online transaction are started. As provided in operation 1020 of FIG. 6, an order (or an update) is entered through PC client system 100 shown in FIGS. 3–5. Constraints are also entered into the order by the operator in operation 1020 of FIG. 6. These constraints comprise such items as "start after a specific date" or "finish before a specific date". The application server 110 "validates" a new order and in case of composite orders it checks for order dependencies. For example, basic and additional services exist in ISDN (Integrated Services Digital Network). The user may only order additional services if the user already has basic services in place, or has placed an order for these. The order with the constraints is transmitted to the application server 110. The application server 110 puts the job to be scheduled onto pending queue 140. The Resource Locking Server 180 shown in FIG. 4 ensures that multiple scheduling engines do not access the same resource pool at the same time. In other words, it prevents double booking of the resource pool resources. The workload server 160 shown in FIG. 5 balances scheduling load among the Scheduling engines 170.

The scheduling engine 170 of FIG. 5 retrieves data from other sub-components as shown in operation 1040 of FIG. 6. A Workflow Area/Planning Area sub-component includes: information about activities; information about pool requests; and information about dependencies. Examples of activities include activity name and activity duration. Examples of work pool activities include availability of a work pool member using a job category (e.g. Technician I). Dependencies determine the order in which tasks need to be done, e.g. Task B can only start after Task A is complete.

The Resource Pool Area sub-component (not shown) contained in database 120 includes information about resource pools, and information about time slots.

Automatic tasks are done without workforce intervention. They get executed in real time or near real time. These automatic tasks are not scheduled in "time slots" since these automatic tasks are entirely performed by a computer and require no human intervention. The workflow engine 185 executes routing of such tasks through different computer systems (not shown in any figure) and reports the success or failure of such tasks as shown in operation 1030 of FIG. 6. Typically such tasks are executed within seconds or minutes of these being entered into the system. The manual tasks need workforce intervention and scheduling, and thus have a much higher level of complexity than automatic tasks. Therefore, the present invention focuses primarily on issues related to manual tasks.

After the schedule engine 170 has completed processing in operation 1040 of FIG. 6, processing of the distributed online system 101 is terminated for new order entry in operation 1050 of FIG. 6.

Apart from new orders, information is entered into the distributed online system 101 throughout the day, which reflects "actuals" from the PC client system 100. "Actuals" is information on activities in progress during that day as shown in operation 1100 and 1110 of FIG. 7. The "actuals" reflect the latest status of activities, e.g. completed on schedule, completed earlier than forecast, and completed later than forecast, or a new forecast completion date for tasks which started and will finish earlier or later than forecast.

Figure 7:
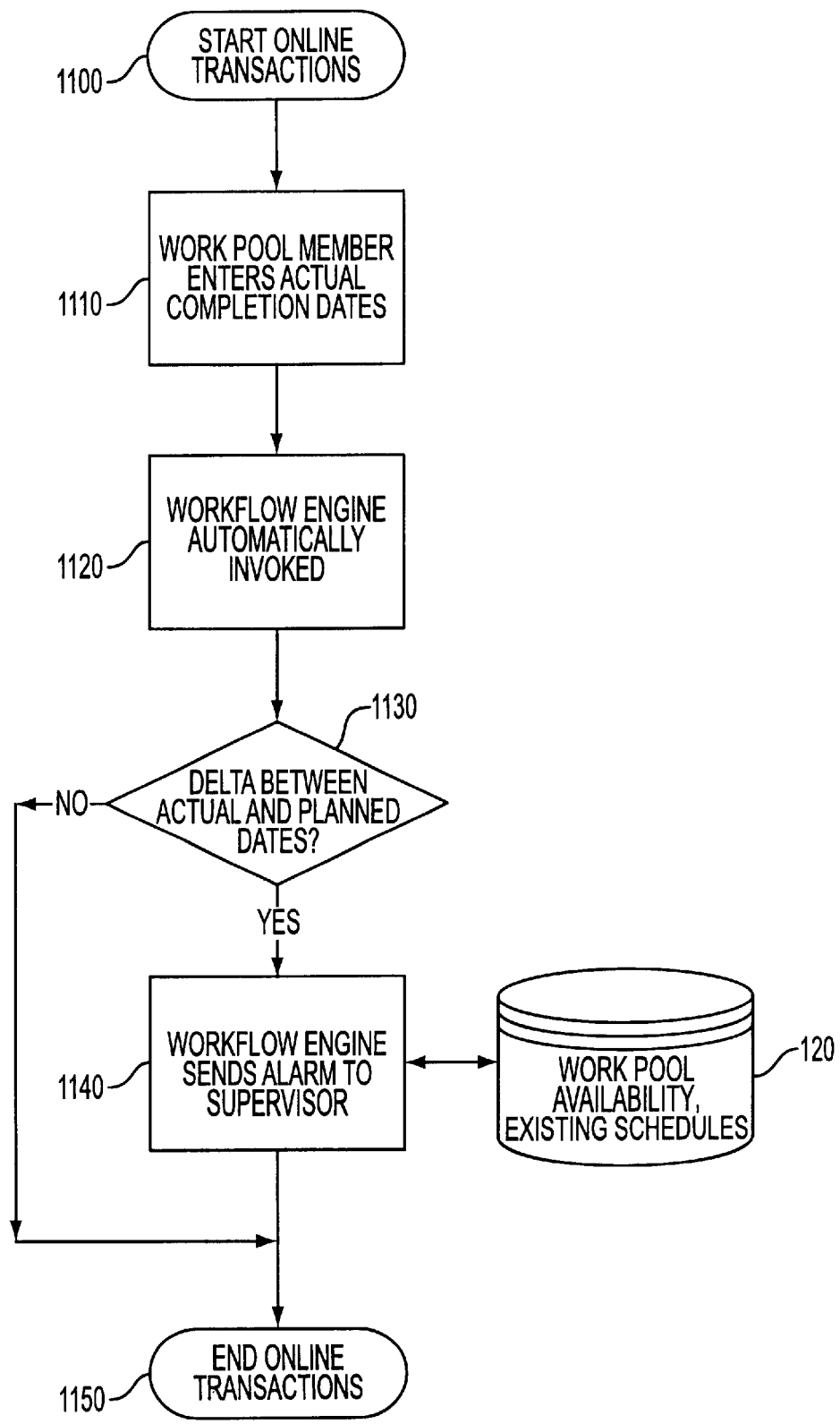
FIG. 7 is a flowchart showing a portion of the online system shown in FIG. 5 dealing with determining completion time frame modifications.

The workflow engine 185 shown in FIG. 4 is invoked in operation 1120 of FIG. 7 and ensures that tasks, which are not completed on time, are kept in the "pending" state with a new forecast completion date as provided in operation 1130 of FIG. 7. Once the new schedule is created, the distributed online system 101 stops execution of this transaction in operation 1150. The workflow engine 185 ensures that no task dependent on another task in the "pending" state is started. The distributed offline system 102 takes the latest forecast into account during its optimization run as provided in operation 1140 of FIG. 7.

Using FIG. 7, if a task slips, there are only two possible states that can exist. First, there are dependent tasks scheduled in the same day. Second, there are no dependent tasks in the same day. In case where there are dependent task scheduled in the same day, an alarm is sent to the supervisor, who can immediately stop dependent tasks scheduled for the same day. The task is left in the pending state. The remaining optimization (beyond the current day) is handled in the offline system 101. The offline system 101 reschedules tasks by taking the latest actuals (which now include the slip) as input and re-optimizes.

Planning Algorithm

Referring to operation 1040 in FIG. 6, the on-line assignment of workers to tasks by the online system 102 is an optimization problem. The number of possible combinations can be very high, in which case a time limit is given for the duration of the solution search. If this time limit is reached, the search will stop and some constraints must be relaxed. This time limit is configurable. The schedule engine 170, shown in FIG. 4, executes the following operations in operation 1040 of FIG. 6.

1. Check temporal constraints of a first type (dependencies between activities and time bounds). This ensures that if an activity B can start on completion of activity A, then the start of activity B is on or after completion of activity A.
2. Check temporal constraints of a second type (includes the structure of pools, i.e. time slots). This ensures that no two dependent tasks are in the same time slot. In the example above discussing activity A and B, where B is dependent on the completion of A, activity A would be in time slot 1, e.g. in the morning, and activity B would be in time slot 2, e.g. in the afternoon or the following day.
3. Pre-select time slots requires the reading of the existing assignments for the pre-selected time slots. The scheduling engine 170 now examines what capacity is available in which time slot. The examination is against resources in work pools.
4. Solve problem using constraint propagation on the set of selected time slots using scheduling engine 170 shown in FIGS. 4 and 5.

Distributed Offline System

Figure 8:
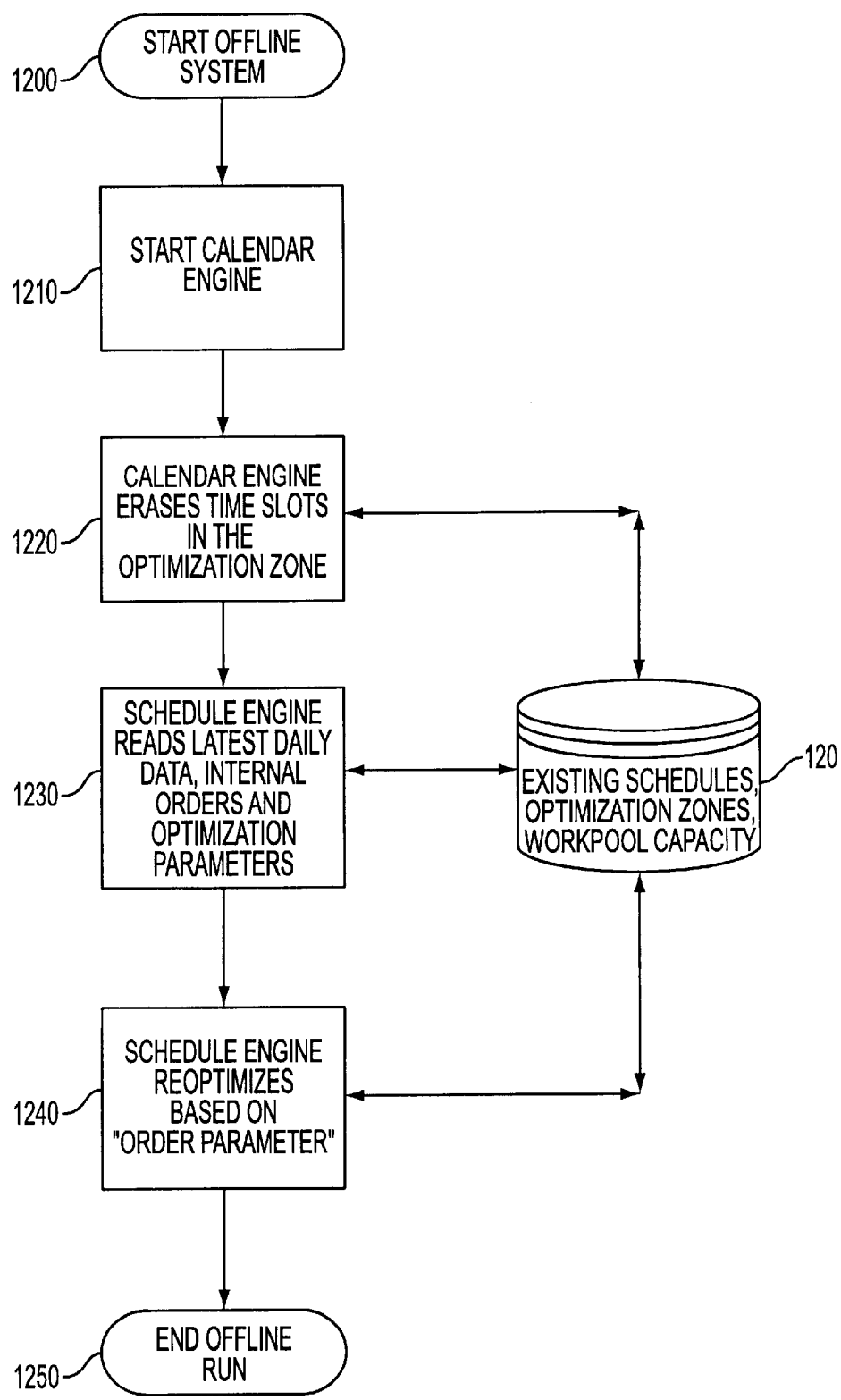
FIG. 8 is a flowchart further detailing the offline system shown in FIG. 5.

The distributed offline system 102, shown in FIG. 9, takes all orders in the system and re-optimizes the jobs and the work pools using the criteria described below as shown in FIG. 8. In operation 1200 of FIG. 8, the distributed offline system 102 is triggered automatically by the Calendar Rule Engine 182, using a configurable parameter.

Scheduling Input

Figure 9:
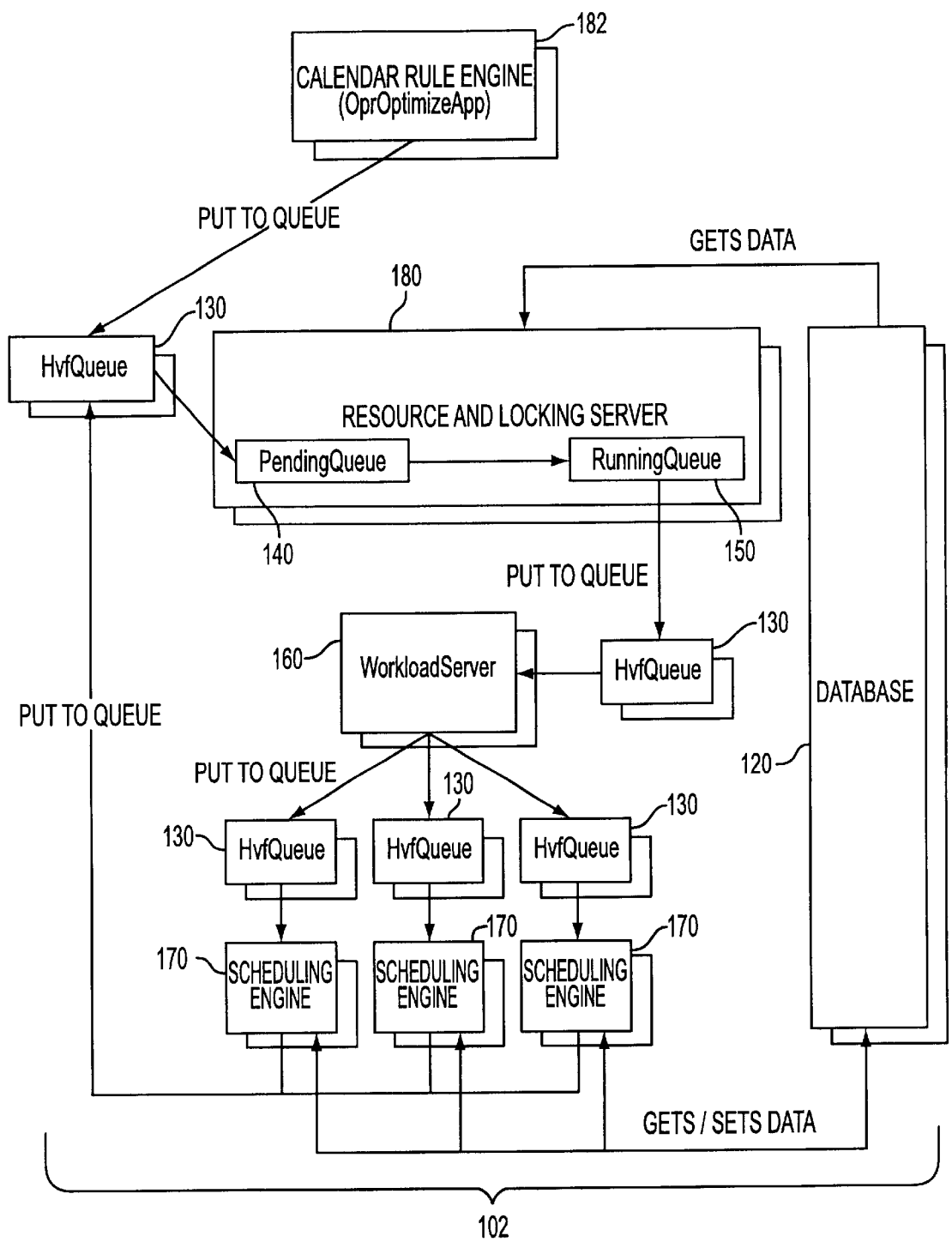
FIG. 9 is a diagram showing the overall software architecture and data flow for distributed offline system in the present invention.

The distributed offline system 102, shown in FIG. 9, and the distributed online system 101, shown in FIG. 9, complement each other. It uses a state of the art optimizer application 195 shown in FIG. 4 (ILOG Solver/Scheduler), capable of optimizing on several criteria. The distributed offline system 102, shown in FIG. 9, takes as input: the results of its own previous run; (i.e. from the previous night) from the database 120 shown in FIG. 9; and updates provided by the online engine. It then re-optimizes all tasks beyond the "frozen zone" shown in FIG. 2. Its output is then taken as the input for the next run of the online engine and placed in the pending queue 140. Hvfqueue stands for High Volume Framework Queue and is used for jobs to be scheduled or rescheduled.

The close collaboration between the distributed online system 101 and distributed offline system 102 ensures a very high degree of optimization and flexibility.

Start up Activities

The distributed offline system 102 shown in FIG. 9 runs periodically, nightly. It then takes as input from database 120 all of the data gathered during the day by the online system though the PC client system 100 including: new orders; canceled orders; modified workflows; completed tasks; and re-forecast tasks.

Referring to FIG. 8, the distributed offline system 102 executes several steps to create a workflow as discussed below. The offline system is initially started as shown in operation 1200 of FIG. 8.

Referring to operation 1210 of FIG. 8, the distributed offline system 102 starts the Calendar Rule Engine 182, which erases those time slots, and the corresponding slot assignments, which lie inside the optimization zone. It should be noted that the start and duration of the optimization zone shown in FIG. 2 is modifiable.

In operation 1230 the offline system 101 reads data from the database 120 to get the latest picture (new orders, canceled orders etc.). Operation 1230 is an initialization operation executed prior to the re-optimization operation 1240. In operation 1240 of FIG. 8, the distributed offline system 102 re-plans all activities, taking into account that tasks, which are assigned to the stability zone 66 should not be modified.

Offline Optimization

Internal orders 10 shown in FIG. 1, which are dependent on other internal orders 10 (not shown) have to be planned in the same run. For example, if $IO_1$ and $IO_2$ (not shown) are dependent so that $IO_1$ must be completed before $IO_2$ can start. This may occur when they belong to the same job in the pending queue and thus should have the same order parameter. The order parameter for a set of dependent activities is the sum of three terms as provided in operation 1240 of FIG. 8. These terms include variables representing priority, due date and tightness. The attributes used in calculating this order parameter are discussed in detail below.

Priority may take on three values including, "high," "medium," and "low", or as discussed above, "Gold", "Silver", and "Bronze". This priority value is based on the perceived value of the customer to the telecom company. Of course, as would be appreciated by one of ordinary skill in the art, how priorities are set is a business decision which would vary based on the needs of the telecom company.

Due date is the deadline by which the order must be finished. For Example, due date could be set as "before June 30". The system would take the latest due date as June 29 and figure out the latest for starting each task in the customer order.

Tightness is an attribute represented by a quotient, which expresses the "freedom in shifting around the order". An internal order 10 of FIG. 1 with a duration of one week and a due date of the "end of first week" is far more tight than an internal order with a duration of one hour and the same due date.

It should be noted that the majority of the orders under consideration were already planned during the running of the distributed online system 101, shown in FIG. 5, using the scheduling engine 170 shown in FIGS. 4 and 5. Thus, the required order parameter is calculated for the distributed offline system 102, shown in FIG. 9, during the running of the distributed online system 101. The required order parameter is calculated using the equation provided below and considerably improves the performance of the offline job. However, this equation may be modified by authorized users to suit the needs of the individual telecom firm.

The required order parameter ("OrderParam"), which determines the order in which IOs 10 are planned during the nightly optimization run by the distributed offline system 102 (higher orderParams go first), is calculated using the following formula:

$$\text{OrderParam} = \text{TightnessWeight} * \text{AVG}_{ManualTasks} (\text{TightnessTerm}) + \text{DueDateWeight} * \text{AVG}_{ManualTasks}(\text{DueDateTerm}) + \text{PriorityWeight} * \text{MAX}(\text{ManualTask.Priority}) * \text{PriorityNormFactor}$$

Where:
  TightnessWeight, DueDateWeight, PriorityWeight: These are relative numeric weight values which determine how important the three values used to calculate OrderParam are, normalized so that TightnessWeight+DueDateWeight+PriorityWeight=1 (reference data)
  $\text{AVG}_{ManualTasks}$ means: Take the average of the formula, for all Manual Tasks in the IO 10.
  MaxOrderParam=10,000: The maximum value possible for OrderParam. This helps to "scale" the values so that differences between very similar IOs can be distinguished more easily.

TimeGrain-scale: Time scale used for calculations, where the beginning of the Frozen Zone is 0, and the end of the Optimization Zone is represented in units of whatever the minimal time grain is (reference data).

Horizon: TimeGrain-scale value for "End of Optimization Zone".

ManualTask StartMin attribute: The earliest starting time for the task, in TimeGrain-scale.

Manual Task StartMax attribute: The latest starting time for the task, in TimeGrain-scale.

Manual Task, ProcTime attribute: The total amount of TimeGrain-time between the earliest start and the latest end time of the task.

TightnessNormFactor=DueDateNormFactor= MaxOrderParam/Horizon.

Valid values for ManualTask.Priority are NORMAL=0, MEDIUM=1, HIGH=2.

PriorityNormFactor=MaxOrderParam/HIGH

TightnessTerm=TightnessNormFactor*(Horizon - (StartMax-StartMin)) /ProcTime ) . . . NOTE, however, the ProcTime term should eventually be changed to be (Horizon-ProcTime).

DueDateTerm=DueDateNormFactor*(Horizon-StartMax)

Optimization process

The new schedule is optimized with respect to certain criteria using optimizer application 195 of FIG. 4 and as shown in operation 1240 of FIG. 8.

Referring to operation 1240 of FIG. 8 and FIG. 5, all internal orders are retrieved from database server 120 by scheduling engine 170 and added to the pending queue 140 of the resource and locking server 180. The jobs in the pending queue 140 are sorted, i.e. the order of the jobs in the pending queue changes as a result of the sort. Only jobs which have all dependencies fulfilled make it to the RunningQueue 150 in the sorted order from the PendingQueue 140. Those which don't have dependencies fulfilled stay in the PendingQueue 140.

The position of the order in the pending queue 140 is relevant for the planning result of this order. The lower the position the higher the probability that the order is planned, because more time slots with unused capacity are available.

Orders are retrieved, planned and optimized by resource locking server 180 based on the pre-sorted PendingQueue 140 as provided in operation 1240 of FIG. 8.

Once optimized the offline system terminates as shown in operation 1250 of FIG. 8.

Alternate Embodiments

The procedures presented herein are not inherently related to any particular computer. In particular, various general-purpose machines may be used with programs described herein. The recommended configuration is a multiprocessor UNIX server linked to a PC running Windows NT.

Further, any number of computer languages may be used. For example, Java may be used instead of C++. Different version of UNIX may also be used as well as any comparable operating system. Almost any processor or computer may be used such as a Sun computer. The system can also be implemented with a different inference engine other than ILOG Rules or different workflow systems. It is also possible to use other schedulers other than the ILOG Solver/Scheduler.

Further, the inference engine used for the workflow engine 1140 in FIG. 7 is altered in the alternate embodiment during the online operation. Instead of sending alarms to the supervisor when a difference occurs between a date/time planned and a date/time achieved (i.e. Planned Vs Actual), as described in the preferred embodiment, operation 1140 can attempt to find a free time slot such that the current day schedule would be optimized taking the delta between Planned and Actual completion into account. If the workflow engine succeeds in operation 1140, the problem is solved. If it does not, the task is left in the pending state, and the problem is resolved during the offline run. In both cases, alarms would still be sent to the supervisor, who controls the workforce. In the case where the workflow engine solves the problem in operation 1140, the alarm would also reference the new schedule created by the workflow system operation 1140 in FIG. 7. The supervisor could either go with this automatically created new schedule for the day, or use manual overrides to modify the schedule.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A work progress tracking system, comprising:
    an online distributed system to receive and produce a schedule comprising a plurality of customer order entries with multiple order constraints;
    a workflow engine monitoring operations completing the order entries, dynamically determining operations needed and changes in operations needed for the order entries and determining operation constraints; and
    an offline distributed schedule optimization system optimizing the schedule responsive to operations completed, the operations needed and the operation constraints.

2. A work progress tracking system according to claim 1, wherein the constraints comprise work force utilization, customer priority, due date, task dependencies, and geographic worker assignments and the schedule is created and optimized based on the constraints.

3. A work progress tracking system according to claim 1, wherein the customer order entries are divided into one or more tasks based on a templates representing products and services stored in a database and the tasks are incorporated into the schedule with a plurality of interdependencies.

4. A work progress tracking system according to claim 3, wherein the plurality of interdependencies indicates which one or more of the tasks must be completed before another task can start.

5. A work progress tracking system according to claim 1, wherein the online distributed system further comprises:
    a schedule engine to schedule the customer order entries based on the optimized schedule created by the distributed offline system.

6. A work progress tracking system according to claim 1, wherein the online distributed system further comprises:
    a database containing templates that divide customer order entries into one or more tasks and a plurality of scheduling rules.

7. A work progress tracking system according to claim 1, wherein the offline distributed system further comprises:
    a database containing templates that divide customer order entries into one or more tasks and a plurality of scheduling rules.

8. A work progress tracking system according to claim 1, wherein the customer order entries are assigned an order priority based on a perceived importance of the client.

9. A work progress tracking system according to claim 8, wherein the order priority is set to either a high, medium, or low value.

10. A work progress tracking system according to claim 8, wherein the online distributed system accepts changes to customer order entries, cancellation of customer order entries, and a required project completion time.

11. A work progress tracking system according to claim 10, wherein the offline distributed system optimizes the schedule based on the order priority, the required project completion time.

12. A work progress tracking system according to claim 1, wherein the online distributed system accepts a workforce utilization value representing the percentage of workforce capacity to be dedicated to processing customer order entries.

13. A work progress tracking system according to claim 12, wherein the offline distributed system optimizes the schedule based on the workforce utilization value.

14. A work progress tracking system according to claim 13, wherein the offline distributed system automatically re-optimizes the schedule based on a change in workforce utilization value entered by the online distributed system.

15. A work progress tracking system according to claim 1, wherein a calendar is divided into a plurality of time zones in which each time zone of the plurality of time zones represents a time period in the calendar containing scheduled customer order entries.

16. A work progress tracking system according to claim 15, wherein one or more of the plurality of time zones are designated as frozen.

17. A work progress tracking system according to claim 16, wherein the customer order entries in the time zones designated as frozen are not optimized by the offline distributed system.

18. A work progress tracking system according to claim 1, wherein the workflow engine monitors completion of tasks associated with customer order entries and automatically takes an action when discrepancies occur.

19. A work progress tracking system according to claim 18, wherein the action taken comprises issuing an alarm when a discrepancy is detected.

20. A work progress tracking system, comprising:
an online distributed system to receive and produce a schedule comprising a plurality of customer order entries with constraints;
a workflow engine to monitor progress in the plurality of customer order entries and automatically take an action when discrepancies occur; and
an offline distributed system to optimize the schedule, wherein the online distributed system comprises:
a database containing templates that divide customer order entries into one or more tasks and a plurality of scheduling rules, and
an inference engine to retrieve the templates and scheduling rules from the database and to check the schedule to determine if it meets the scheduling rules.

21. A work progress tracking system, comprising:
an online distributed system to receive and produce a schedule comprising a plurality of customer order entries with constraints;
a workflow engine to monitor progress in the plurality of customer order entries and automatically take an action when discrepancies occur; and
an offline distributed system to optimize the schedule, wherein the offline distributed system comprises:
a database containing templates that divide customer order entries into one or more tasks and a plurality of scheduling rules, and
an inference engine to retrieve the templates and scheduling rules from the database and to check the schedule to determine if it meets the scheduling rules.

22. A work progress tracking system, comprising:
an online distributed system to receive and produce a schedule comprising a plurality of customer order entries with constraints;
a workflow engine to monitor progress in the plurality of customer order entries and automatically take an action when discrepancies occur;
an offline distributed system to optimize the schedule, and
wherein the customer order entries are assigned an order priority based on a perceived importance of the client, the online distributed system accepts changes to customer order entries, cancellation of customer order entries, and a required project completion time, the offline distributed system optimizes the schedule based on the order priority, the required project completion time, and the offline distributed system optimizes the schedule to minimize cost, minimize time periods in the schedule where no activity is scheduled, and based on an analysis of the jeopardy to the schedule.

23. A work progress tracking system according to claim 22, wherein the jeopardy to the schedule is determined by a probability that the required completion date will not be met.

24. A work progress tracking system, comprising:
an online distributed system to receive and produce a schedule comprising a plurality of customer order entries with constraints;
a workflow engine to monitor progress in the plurality of customer order entries and automatically take an action when discrepancies occur;
an offline distributed system to optimize the schedule, and
wherein the online distributed system accepts a plurality of worker identifiers, and assigns a plurality of workers as identified by the worker identifiers to at least one work pool based on skills possessed by each of the plurality of workers and a geographic area each of the plurality of workers is assigned to.

25. A work progress tracking system according to claim 24, wherein the online distributed system accepts both permanent and temporary changes of workers assigned to the work pool.

26. A work progress tracking system according to claim 25, wherein the online distributed system schedules customer order entries taking into consideration the changes of workers assigned to the work pool.

27. A work progress tracking system according to claim 26, wherein the offline distributed system automatically optimizes the schedule when changes in the work pool occur.

28. A work progress tracking system, comprising:
an online distributed system to receive and produce a schedule comprising a plurality of customer order entries with constraints;
a workflow engine to monitor progress in the plurality of customer order entries and automatically take an action when discrepancies occur;
an offline distributed system to optimize the schedule, and wherein the workflow engine monitors completion of tasks associated with customer order entries and automatically takes an action when discrepancies occur, the action taken comprising issuing an alarm when a discrepancy is detected, and finding a free time slot such that a current day schedule would be optimized taking the discrepancy into account.

29. A work progress tracking system according to claim 28, wherein the discrepancy is a delta between a planned and an actual completion of a task.

30. A work progress tracking system, comprising:
a database containing scheduling rules and templates representing products and services stored in a database comprising a plurality of tasks for every possible work order and a plurality of dependencies indicating which tasks of the plurality of task must be completed before other dependent tasks can start;
an online distributed system to receive and produce a schedule comprising a plurality of customer order entries with constraints, wherein the constraints comprise work force utilization, customer priority, due date, task dependencies, and geographic worker assignments;
a workflow engine to monitor progress in the plurality of customer order entries and automatically issue an alarm and find a free time slot when available to schedule a task associated with a customer order entry of the plurality of customer order entries when a delta occurs between a planned and actual completion of the task; and
an offline distributed system to optimize the schedule based on the scheduling rules, templates and dependencies stored in the database;
the online distributed system further comprising:
a schedule engine to schedule the customer order entries based on the optimized schedule created by the distributed offline system; and
an inference engine to retrieve the templates and scheduling rules from the database check the schedule to determine if it meets the scheduling rules.

31. A method of work progress tracking, comprising:
receiving a plurality of customer order entries with multiple constraints;
incorporating the customer order entries into a schedule;
monitoring the progress of operations on the plurality of customer order entries, dynamically determining operations needed and changes in operations needed for the order entries and determining operation constraints; and
optimizing the schedule responsive to operations completed, operations needed and operation constraints.

32. A method of work progress tracking, according to claim 31, wherein the plurality of customer order entries comprise constraints comprising work force utilization, customer priority, due date, task dependencies, and geographic worker assignments.

33. A method of work progress tracking system according to claim 32, wherein the customer order entries are divided into one or more tasks based on a templates representing products and services stored in a database; and
incorporating the tasks are incorporated into the schedule with a plurality of interdependencies.

34. A method of work progress tracking according to claim 33, wherein the plurality of interdependencies indicates which one or more of the tasks must be completed before another task can start.

35. A method of work progress tracking system according to claim 34, further comprising:
dividing customer order entries into one or more tasks based on templates contained in a database.

36. A method of work progress tracking according to claim 35, further comprising:
scheduling the tasks based on scheduling rules contained in a database.

37. A method of work progress tracking according to claim 31, wherein the customer order entries are assigned an order priority based on a perceived importance of the client.

38. A method of work progress tracking according to claim 37, wherein the order priority is set to either a high, medium, or low value.

39. A method of work progress tracking according to claim 38, further comprising:
entering changes to customer order entries;
entering cancellations of customer order entries; and
entering a required project completion time.

40. A method of work progress tracking according to claim 39, further comprising:
optimizing the schedule based on the order priority and the required project completion time.

41. A method of work progress tracking according to claim 31, further comprising:
entering a workforce utilization value representing the percentage of workforce capacity to be dedicated to processing customer order entries.

42. A method of work progress tracking according to claim 41, further comprising:
optimizing the schedule based on the workforce utilization value.

43. A method of work progress tracking according to claim 31, wherein the monitoring of the progress of the plurality of customer order entries further comprises monitoring completion of tasks associated with the plurality of customer order entries and automatically taking an action when discrepancies occur.

44. A method of work progress tracking according to claim 43, wherein the action taken comprises issuing an alarm when a discrepancy is detected.

45. A method of work progress tracking, comprising:
receiving a plurality of customer order entries;
incorporating the customer order entries into a schedule;
monitoring the progress of the plurality of customer order entries and automatically taking an action when a discrepancy is detected;
optimizing the schedule;
assigning the customer order entries an order priority based on a perceived importance of the client;
setting the order priority to either a high, medium, or low value;
entering changes to customer order entries;
entering cancellations of customer order entries;
entering a required project completion time;
optimizing the schedule based on the order priority and the required project completion time; and
optimizing the schedule to minimize cost, minimize time periods in the schedule where no activity is scheduled, and based on an analysis of the jeopardy to the schedule.

46. A method of work progress tracking according to claim 45, wherein the jeopardy to the schedule is determined by a probability that the required completion date will not be met.

47. A method of work progress tracking involving a plurality of workers processing a plurality of customer order entries, comprising:

receiving the plurality of customer order entries;

incorporating the customer order entries into a schedule;

monitoring the progress of the plurality of customer order entries being processed by the plurality of workers and automatically taking an action when a discrepancy is detected;

optimizing the schedule; and assigning the plurality of workers processing the plurality of customer order entries to at least one work pool based on skills possessed by each of the plurality of workers and a geographic area each of the plurality of workers is assigned to.

48. A method of work progress tracking according to claim 47, changing both permanent and temporary basis workers assigned to the work pool.

49. A method of work progress tracking according to claim 48, further comprising:

scheduling customer order entries taking into consideration the changes of workers assigned to the work pool.

50. A method of work progress tracking according to claim 49, further comprising:

optimizing the schedule when changes in the work pool occur.

51. A method of work progress tracking, comprising:

receiving a plurality of customer order entries;

incorporating the customer order entries into a schedule;

monitoring the progress of the plurality of customer order entries and automatically taking an action when a discrepancy is detected;

optimizing the schedule; and dividing a calendar into a plurality of time zones and entering scheduled customer order entries into the calendar where each time zone of the plurality of time zones represents a time period in the calendar containing scheduled customer order entries.

52. A method of work progress tracking according to claim 51, wherein one or more of the plurality of time zones are designated as frozen.

53. A method of work progress tracking according to claim 52, further comprising:

optimizing only the customer order entries in the time zones not designated as locked.

54. A method of work progress tracking, comprising:

receiving a plurality of customer order entries;

monitoring the progress of the plurality of customer order entries and automatically taking an action when a discrepancy is detected; and incorporating the customer order entries into a schedule;

optimizing the schedule, wherein the monitoring of the progress of the plurality of customer order entries comprises monitoring completion of tasks associated with the plurality of customer order entries and automatically taking an action when discrepancies occur, and wherein the action taken comprises issuing an alarm when a discrepancy is detected and finding a free time slot such that a current day schedule would be optimized taking the discrepancy into account.

55. A method of work progress tracking according to claim 54, wherein the discrepancy is a delta between a planned and an actual completion of a task.

56. A method of work progress tracking system, comprising:

receiving a plurality of customer order entries;

retrieving a template of tasks from a database for each customer order entry having constraints comprising work force utilization, customer priority, due date, task dependencies, and geographic worker assignments;

dividing the customer order entries into tasks based on the template having a plurality of dependencies;

incorporating the plurality of tasks for each customer order entry into a schedule;

dividing the schedule into a plurality of time zones comprising a frozen time, a stability time zone, and an optimization time zone;

monitoring the progress of the tasks and automatically issuing an alarm and finding a free time slot to schedule the task when a free time slot exists when a delta is discovered between a planned task completion and an actual task completion; and optimizing the schedule in the optimization zone.

* * * * *

UNITED STATES PATENT AND TRADEMARK OFFICE
CERTIFICATE OF CORRECTION

PATENT NO.    : 6,415,259 B1  
DATED         : July 2, 2002  
INVENTOR(S)   : Charles Wolfinger et al.

It is certified that error appears in the above-identified patent and that said Letters Patent is hereby corrected as shown below:

Title page,
Item [75], change "Chase" to -- Charles --.
After Item [57], after "56 claims 9 Drawing Sheets" insert -- Microfiche Appendix Included (6 Microfiche, 555 Frames) --.

Column 2,
Line 63, change "optimizes" to -- optimize --.

Column 5,
Line 46, after "joins" insert -- ) --.

Signed and Sealed this

Twenty-sixth Day of November, 2002

Attest:

Attesting Officer

JAMES E. ROGAN
*Director of the United States Patent and Trademark Office*